United States Patent [19]
Willett et al.

[11] Patent Number: 5,271,691
[45] Date of Patent: Dec. 21, 1993

[54] OIL ABSORPTION APPARATUS USING KENAF FIBER AND CORE PORTIONS

[76] Inventors: Harold A. Willett, P.O. Box 392, Jeanerette, La. 70544; Christopher Willett, 106 Marie St., New Iberia, La. 70560

[21] Appl. No.: 891,761
[22] Filed: Jun. 1, 1992
[51] Int. Cl.⁵ ............................................. E02B 15/00
[52] U.S. Cl. ................................. 405/60; 210/924; 405/63
[58] Field of Search ........................... 405/60, 63-72, 405/52; 210/924

[56] References Cited

U.S. PATENT DOCUMENTS

| | | | |
|---|---|---|---|
| 3,464,920 | 9/1969 | Pirson et al. | 210/924 X |
| 3,617,565 | 11/1971 | Fahlvik | 210/924 X |
| 4,031,005 | 6/1977 | Der | 210/924 X |
| 4,111,813 | 9/1978 | Preus | 210/924 X |
| 4,234,420 | 11/1980 | Turbeville | 210/924 X |
| 4,519,918 | 5/1985 | Ericsson et al. | 210/924 X |
| 5,009,790 | 4/1991 | Bustamante et al. | 210/924 X |
| 5,039,414 | 8/1991 | Mueller et al. | 210/924 X |

*Primary Examiner*—Dennis L. Taylor
*Attorney, Agent, or Firm*—Pravel, Hewitt, Kimball & Krieger

[57] ABSTRACT

An oil cleanup method and apparatus uses processed kenaf that is processed using a cutter to preliminarily cut the kenaf stalks into short pieces or billets. These billets are threshed to separate fiber and core portions of the kenaf billets. The billet size thus defines the fiber length and thus fiber product texture. Separators grade the particulate core after threshing. The core particles are added to a container such as a bale or boom that will float on the surface of an oil slick in an aquatic or marine environment. The bales can also be added to dry spills to absorb the oil. The particulate kenaf core can be added to a treatment vessel, such as a vertical column and with inlet and outlet portions. Wastewater with an oil portion can be added to the treatment vessel and the core particles removes oil from the wastewater stream. Sludge solidification can be accomplished with the kenaf particles.

10 Claims, 5 Drawing Sheets

FIG. I

OIL ABSORPTION APPARATUS USING KENAF FIBER AND CORE PORTIONS

BACKGROUND OF THE INVENTION

1. Field of the Invention

The present invention relates to a method and apparatus for the treatment of oil spills using kenaf core and fiber. More particularly, the present invention relates to an improved method and apparatus for the treatment of oil spills, in both marine and earthen environments using kenaf that has been refined into fiber and core portions. Even more particularly, the present invention relates to a method and apparatus for absorbing oil pollution in both aquatic and dry earthen environments, including the absorption of oil on dry surfaces and the separating of oil and water as in the case of marine spills, and wastewater streams, using the inner core of kenaf that has been separated from the outer fiber and pulverized into selected particle sizes.

2. General Background

Presently, a great deal of separated bast fiber is being imported into the United States as a raw material to make carpet padding and reinforcing mats for molded products. In the past a great deal of fiber was imported to make rope, twine, and burlap sacks. Most if not all of the fiber that is imported into the United States is separated by hand in third world countries where labor is extremely cheap. In these countries, the fiber is hand stripped from the stalk and made into bales for shipment. Usually, the inner core material is burnt as a waste causing ecological problems.

When the processed fiber arrives in this country, the bales are passed through a guillotine machine where the long fiber is cut up to a desired length before it goes into cleaning and manufacturing process. With the extensive Research and Development done in the past years by the USDA and private industry, fiber crops such as Kenaf and Cotalaria are being grown successfully in the Southern areas of the United States.

This crop is no being harvested by a newly developed system that lays the cut whole stalks in an orderly windrow cross ways to the planted row. The windrows are left in the field for a reasonable time to facilitate field drying by the sun. After field drying, the dried fibrous stalks are hauled to a staging area where it is stored until the next processing step. This next step was the passing of the whole stalk material through a shredder that shreds the wholestalk into a mixture of core and bast fiber. The fiber is short and well mixed with the core.

This presently used processing method makes good material for the present system of making paper but the fiber is unsatisfactory for other processes that require uniformity in length and good separation.

Non uniform length of bast fibers and core mixed with the fibers is a problem that would prevents U.S. grown kenaf and other like fibers from becoming an accepted fiber for many end users in this country. Many other methods have been tried unsuccessfully to eliminate this problem.

Most manufacturers that use imported fiber receive their imported fiber in bales. The fiber is hand stripped from the cut wholestalks and is four to six feet in length. When the fiber is put into the process it is first put through a guillotine process that cuts the fiber bales into short (for example eight inch) lengths. The cut pieces are then threshed and cleaned. A majority of the fibers retain the cut length.

Field dried wholestalks have been passed through a shredder which is set to give maximum length and to breakup as much core as possible. This incoming wholestalk product is continuously cut in eight inch lengths in the threshing process. This procedure gives a better fiber but not enough uniformity to be accepted by the final user in many cases.

The next trials were of kenaf stalks cut into pieces of lengths from five to ten inches. These were hand separated and measured for consistency. The length was almost one hundred percent consistent and the core was in a good size with very little small pieces of core to get entangled in the bast fiber.

When separated into core and fiber portions, kenaf can be sized and graded so that the fiber length is known and the core is of a particle size that is known. The core can be placed in a boom or in bales for use in control and pickup of oil spills in a marine or other aquatic environment. The bales can also be used to absorb oil in a dry environment such as spills on shop floors and the like. The kenaf core can be pulverized and graded into particulate sizes that are selected for use in the filtration of oil and water when the selected particulate kenaf core is placed in a separation vessel or chamber or cylinder or the like.

Particulate kenaf can be used in the pickup of floating oil such as in a spill or wastewater environment, because the core particles float. This places the kenaf core in contact with the floating oil when the kenaf core is dumped onto floating oil.

Particulate kenaf can be used in the pickup of oil spilled on a dry surface. In such a cleanup method, the particulate kenaf core of selected particle size is dumped onto the spill and the core absorbs oil as the particles mix with the oil. This ability to absorb also allows use of kenaf in sludge solidification.

SUMMARY OF THE INVENTION

The present invention thus provides an improved method for processing of kenaf into fiber and core portions which can be used to then absorb oil in a marine or aquatic environment or on dry surfaces. The method includes first cutting each of the stalks into a plurality of short billets. Each of the billets is then broken up sufficiently to separate at least a portion of the core from the fiber portion of the billet and thereafter portion of the core are gravity separated from the billets leaving a portion of the core and a portion of the fiber. In the preferred method, the billets are between five and nine inches in length. In the preferred embodiment, the core and fiber are eventually separated into separate portions and wherein the core is grated into a plurality of different particulate sizes. In the preferred method, the fiber has a texture that is defined by the length of each billet as the manufacturing method does not substantially alter the length of the fibers once the individual wholestalks are cut into billets.

The kenaf core of a particulate size of between 1/32 and ¼ inches can be packaged into bales for use as individual packs for the pickup of oil in either a marine, aquatic or dry surface environment. This environment can include oil spills, wastewater with floating oil, wastewater with suspended oil, bilges of vessels, and dry surfaces.

In the control of oil spills in a marine or aquatic environment, the bales or packs of kenaf core can be connected end to end so that the spill is contained while at the same time, the packs or bales of kenaf soak up and absorb oil as part of a cleanup effort. Once a boom has been used to contain the oil spill, free kenaf core particulate material can be dumped onto the oil inside the boom so that the free particles of kenaf absorb the oil floating on the water surface. In the treatment of oil spills, kenaf core particulate material of between 1/32 and ¼ inches in diameter is preferred.

In the treatment of wastewater having an oil portion such as floating or suspended, the kenaf core can be placed in a vertical column for example, so that wastewater is added to one end portion of the column and filtered, treated water exits the other end portion of the column, with the kenaf core absorbing the oil portion or phase of the wastewater stream. For the treatment of wastewater containing oil, kenaf core of between 1/32 and 3/8 inches in diameter is placed into a vertical column or like treatment vessel. The kenaf core thus absorbs oil contained in the wastewater stream as the stream passes through the column or treatment vessel.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
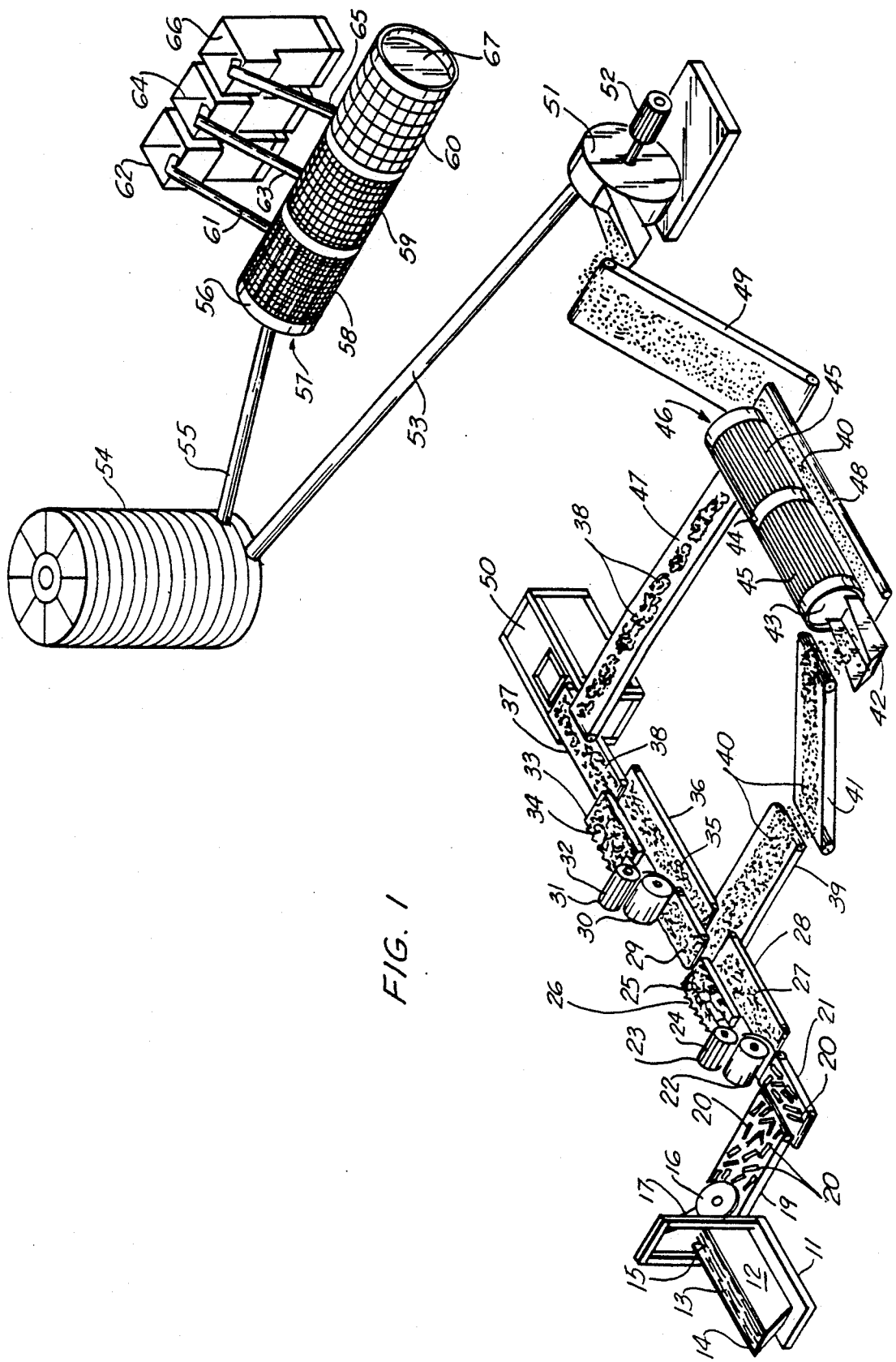
FIG. 1 is a schematic perspective illustration of the preferred embodiment of the apparatus of the present invention.

FIG. 1 illustrates the preferred embodiment of the apparatus of the present invention designated generally by the numeral 10.

In FIG. 1, the kenaf processing apparatus 10 of the present invention provides an intake in the form of hopper frame that receives kenaf wholestalks 13 deposited in generally parallel, bunch fashion (e.g., 250–300 pounds per grab) into receptacle 12. Typically, the kenaf wholestalks 13 would be added to the hopper 12 using a grab loader of the type used in the sugar cane industry for lifting cut sugar cane wholestalks from the fields.

Figure 3:
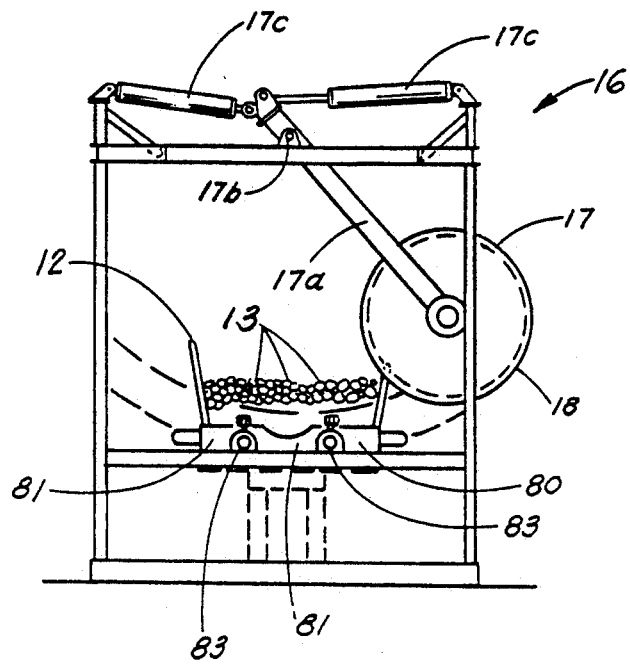
FIGS. 3 and 4 are fragmentary views of the preferred embodiment of the apparatus of the present invention illustrating the rotary knife portion thereof.
Figure 4:
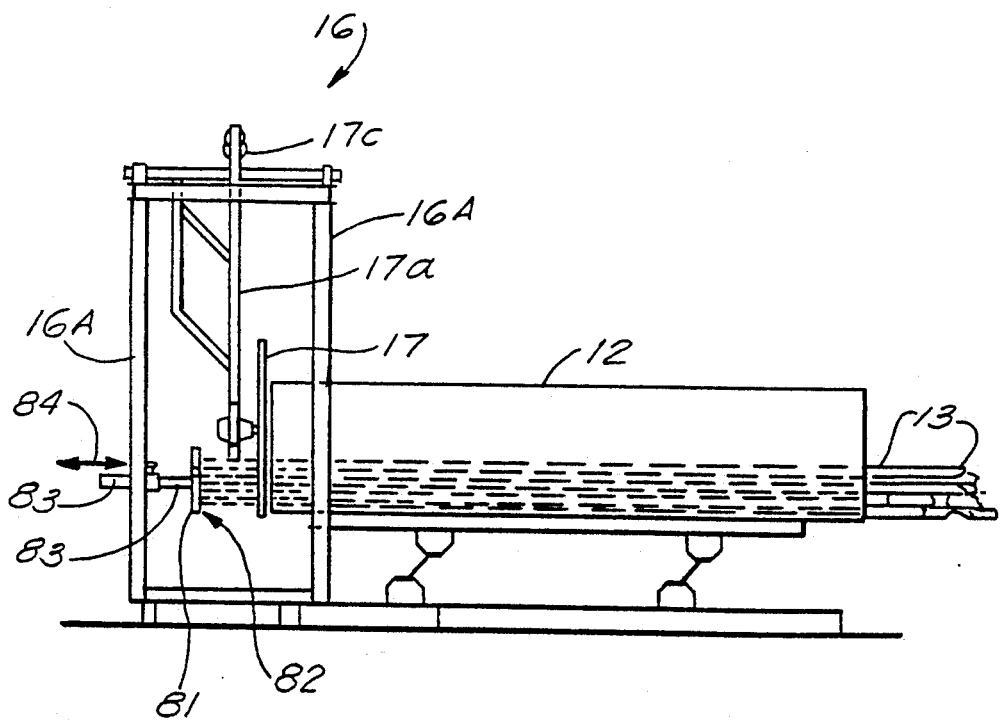

The kenaf wholestalks 13 include end portions 14, 15 with the end portion 15 being fed first into a cutting blade assembly 16. The cutting blade 16 (see FIGS. 3 and 4) is preferably a powered saw 17 supported upon frame 16a. Saw 17 cuts through the kenaf wholestalks 13. The wholestalks 13 are very fibrous and thus difficult to cut with pinch type blade arrangements and/or rotary type blade arrangements. The blade is a powered rotary blade 17 with saw teeth 18 along its periphery for cutting through the wholestalks 13. The blade 17 is powered to rotate with a motor, and the blade 17 pivots about pivot 17b upon arm 17a. Extensible cylinders 17c power the arm 17a from side to side. Gauge 80 is adjustable to define the length of billet cut by blade 17. Gauge 80 has a transverse portion 81 that presents a flat face 82 to wholestalks 13. Shaft 83 is axially adjustable upon frame 16a to adjust the distance between blade 17 and face 82. The face 82 is adjusted to a desired spacing from blade 17. Then, wholestalks are advanced toward face 82. The ends of the wholestalks 13 abut the face 82. The blade 17 then cuts the wholestalks the desired length. Arrow 84 in FIG. 4 shows the direction of adjustability of gauge 80 relative to saw blade 17.

A conveyor 19 transports the cut billets 20 to conveyor 21 which then passes the stalks to drums 22, 23. At least on ®of the drums 23 provides transverse ribs or teeth 24 which help crush and break apart the kenaf billets. This begins the process of breaking up the interior core and separating that core from the more fibrous exterior portion, known as the fiber bast.

A separator tray or straw walker 25 receives the crushed billets 26. This separator bounces the billets 20 up and down. Such separators 25 are commercially available. Conveyor 27 receives portions of the crushed billets 26 which fall through separator 25. This separated portion which falls through tray 25 to conveyor 28 is core.

Conveyor 29 receives crushed and broken up billets 26. The crushed billets 26 still contain some core and conveyor 29 transports the billets 26 to the drums 30, 31. The drum 31 includes transverse ribs 32 which help break up the crushed billets 26 even further.

A second separator tray 33 receives material that is discharged from the pair of drums 30, 31. The material in separator tray 33 is secondarily crushed billets 34 which is now mostly fiber in that some of the core material was separated at the tray 25. The crushed billets 34 are agitated with the tray 33 and core material 35 falls through the tray to the conveyor 36. The material discharged from the conveyor 36 is thus core material 35. The core material 35 from conveyor 36 and the core material 28 from conveyor 27 combine at conveyor 39 to form the final core material product 40 which enters hopper 42 via conveyor 41. Fiber material is discharged from conveyor 37 as fiber material 38 into baler 50. It should be understood that the fiber material 38 transmitted to baler 50 is in fiber lengths substantially equal to the length of cut billets 20. Thus, the method of the present invention provides a means of controlling the texture of the fiber product by cutting the billets 20 into desired lengths which approximate the length of the final fiber 38 product. A high percentage of fiber of a particular desired fiber length can be obtained by selecting fiber length as the length of the cut billets 20.

Core material 40 is discharged from hopper 42 into inlet 43 of rotary separator 44. The rotary separator 44 includes cylindrical screen portions 45 for removing any remaining fiber material 38 from the core material 40. The remaining fiber material is discharged to conveyor 47 which transmits that fiber material 38 to conveyor 37 and then to baler 50. Core material 40 falls through the screens 45 of rotary separator 44 reaching conveyors 48, 49.

Conveyor 49 discharges the entire core portion of the original kenaf wholestalks 13 into hammer mill 51 which is powered with motor drive 52. Such hammer mills 51 are commercially available. The core material is transmitted via conduit 53 to silo 54 and then via conduit 55 to rotary separator 56. Air flow within silo 54 of a desired temperature can be used to adjust the water content of the core material 40 so that it contains only about twenty-five percent water upon exiting silo 54 via conduit.

Core material 40 enters rotary separator 56 via conduit 55. The rotary separator 56 is generally cylindrically shaped having an open inlet end portion 57 and a closed circular end portion 67. The rotary separator 56 includes a fine mesh size cylindrical screen portion 58, a medium mesh size cylindrical screen portion 59, and a coarse mesh size cylindrical screen portion 60.

Each of the screen portions 58–60 has a corresponding conduit 61, 63, 65 for transmitting the graded core material 40 into storage bins 62, 64, 66 corresponding to fine, medium, and coarse particulate core material. In the preferred embodiment, the fine core material 40 is one-eighth inch diameter or smaller. The medium core material 40 is up to one-quarter inch in diameter while the coarse material can be on the order of one-half–one inch in diameter.

Figure 2:
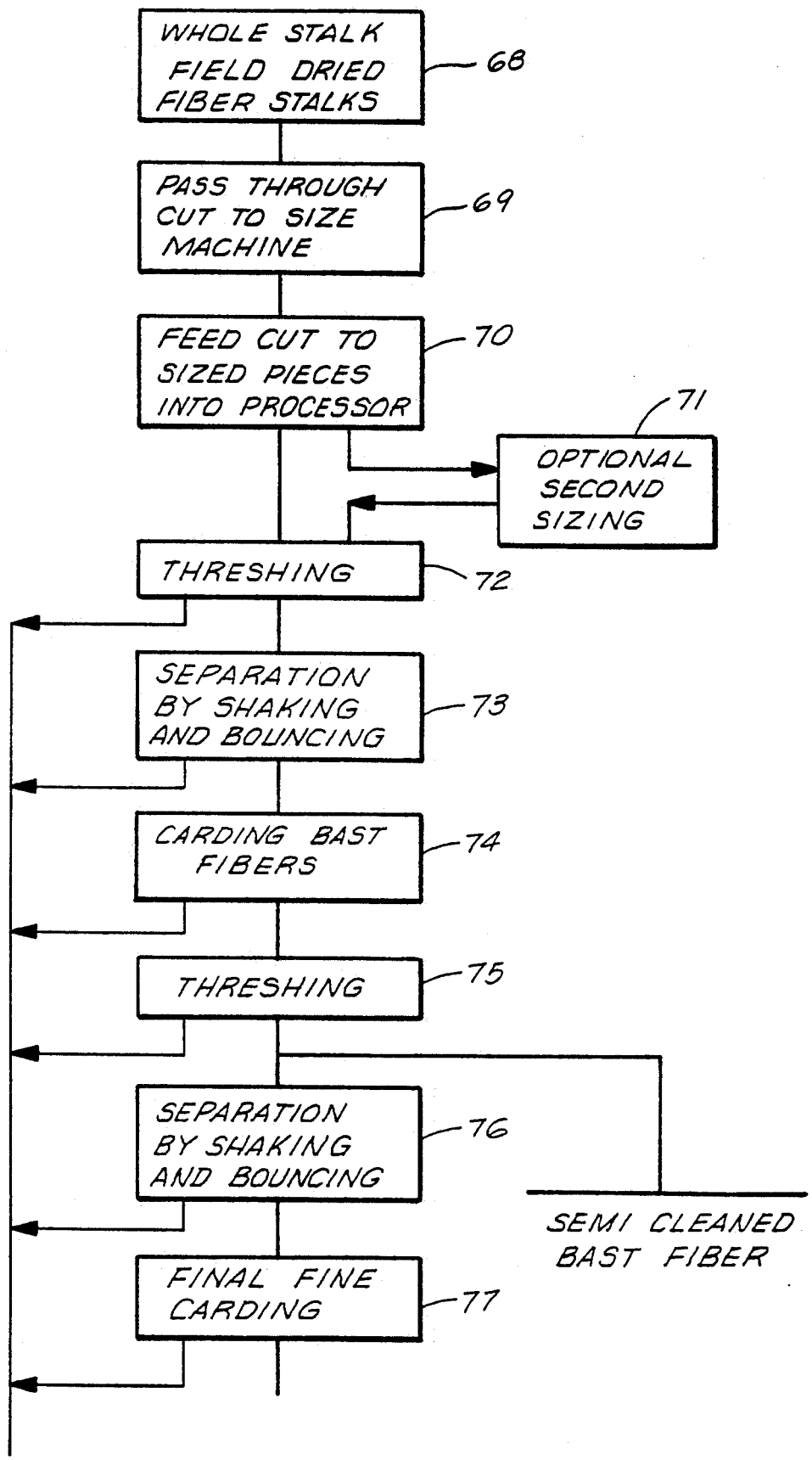
FIG. 2 is a schematic block diagram of the method of the present invention.

FIG. 2, a block diagram illustrates generally and in summary the method of the present invention with individual 15 block schematically representing method steps 68–67. Kenaf wholestalks are field dried and then passed through a cutting machine which cuts the wholestalks into billets which are of selective lengths, such as six inches, seven inches, eight inches in length, etc. The wholestalk field drying and cutting steps are designated as 68, 69 respectively in FIG. 2. The cut pieces can be sized before being fed into the processor at station 70 and an optional sizing step 71 can be made to insure proper sizing of the billets depending upon the desired fiber length. At 72, a threshing step produces some core material as does the preliminary separation 73 and the secondary separation 76. Fiber material is removed at station 74 while the station 75 provides additional threshing. In the final step, the core material is graded into the various particle sizes, designated as the block 77. This produces a final core product, cleaned bast fibers, and semi-cleaned bast fibers as part of the overall method.

Figure 5:
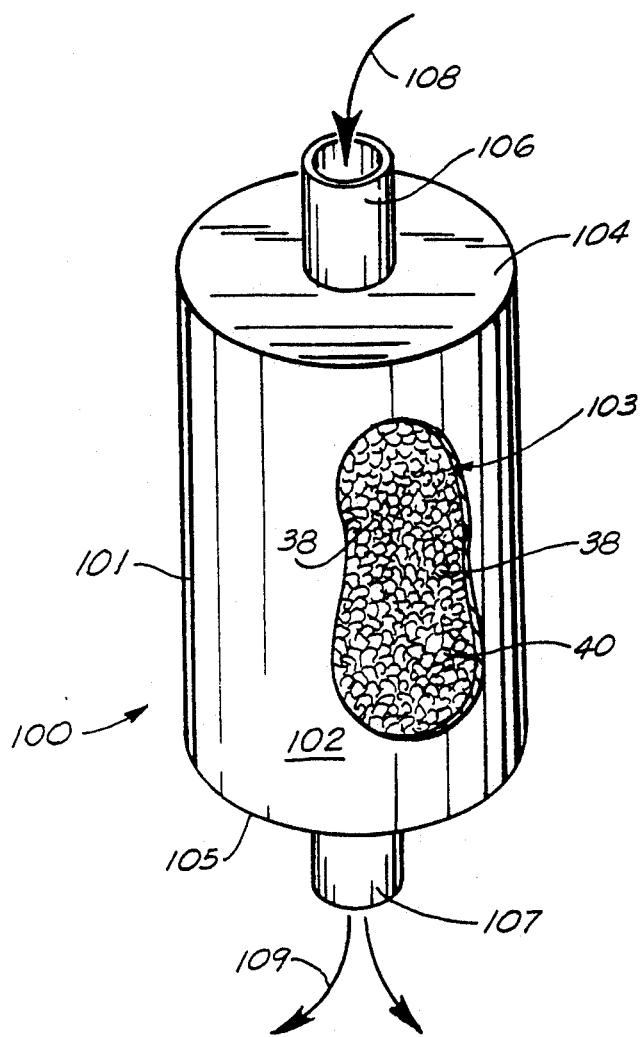
FIG. 5 is a perspective view of a filtration apparatus illustrating the use of the present invention in the filtration of wastewater containing oil.

FIGS. 5–8 illustrated the use of refined kenaf in the treatment of oil spills and in the cleanup of wastewater containing oil wherein kenaf functions as an oil absorption media. In FIG. 5, an oil separation apparatus 100 is shown in the form of a cylindrical vessel 101. Vessel 101 has an outer wall 102 which is generally cylindrically shaped, providing a hollow interior 103. A pair of generally circular end plates 104, 105 are provided at each end of the cylindrical outer wall 102. Each end plate has an opening therein (not shown) and a flow inlet 106 is provided for allowing influent flow to enter hollow interior 103 at end plate 104. Similarly, a cylindrically shaped flow outlet 107 is attached to end plate 105 for the purpose of allowing cleaned water to leave as effluent from the vessel interior 103. In FIG. 5, the influent of oily wastewater is designated generally by the arrow 108. The discharge of clean water is designated generally by the arrow numbered as 109. The interior 103 is filled with particulate kenaf core 40 or a combination of kenaf core 40 and kenaf fiber 38 which can be, for example, particulate kenaf core 40 manufactured in accordance with the method of the present invention as discussed above.

Figure 6:
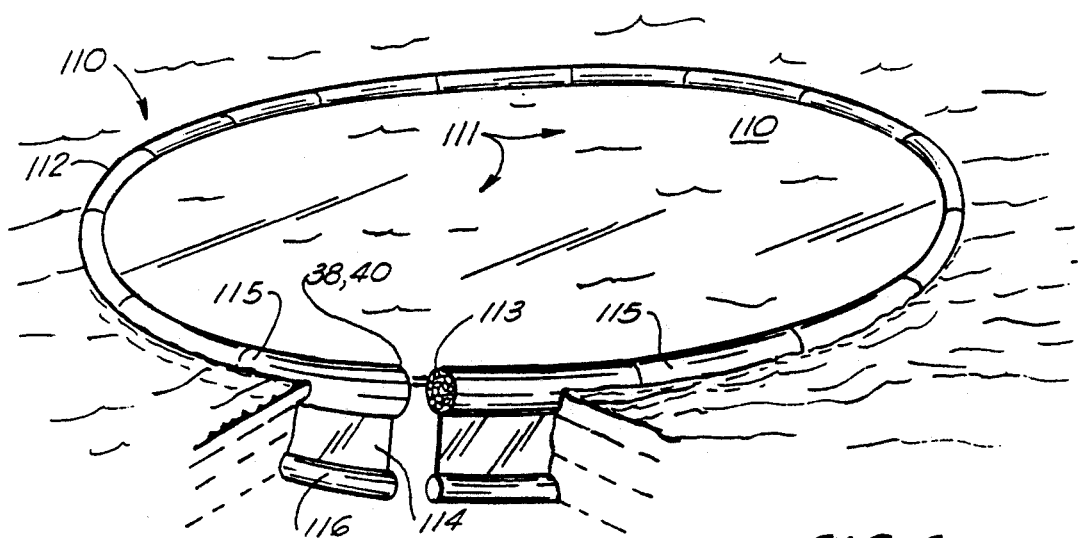
FIG. 6 is a schematic, perspective view illustrating an oil containment boom using kenaf refined according to the teachings of the present invention.
Figure 7:
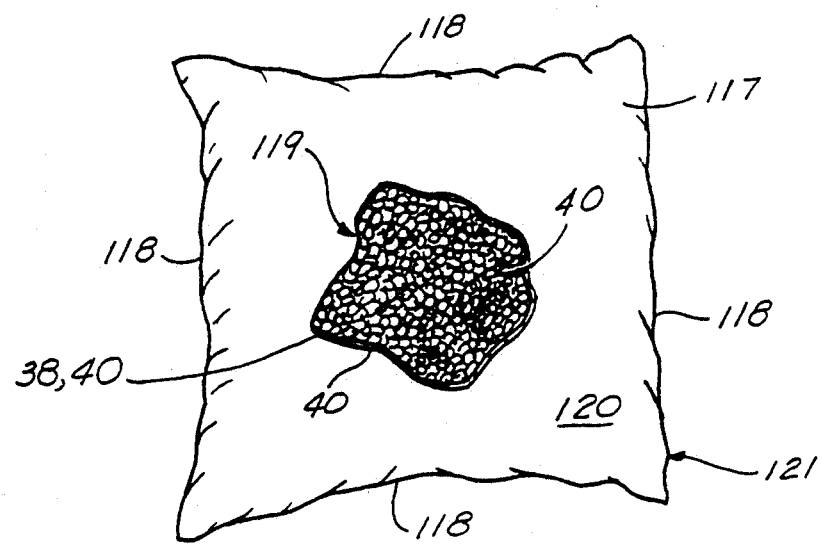
FIG. 7 is an oil-absorbing pad construction using kenaf refined according to the present invention.
Figure 8:
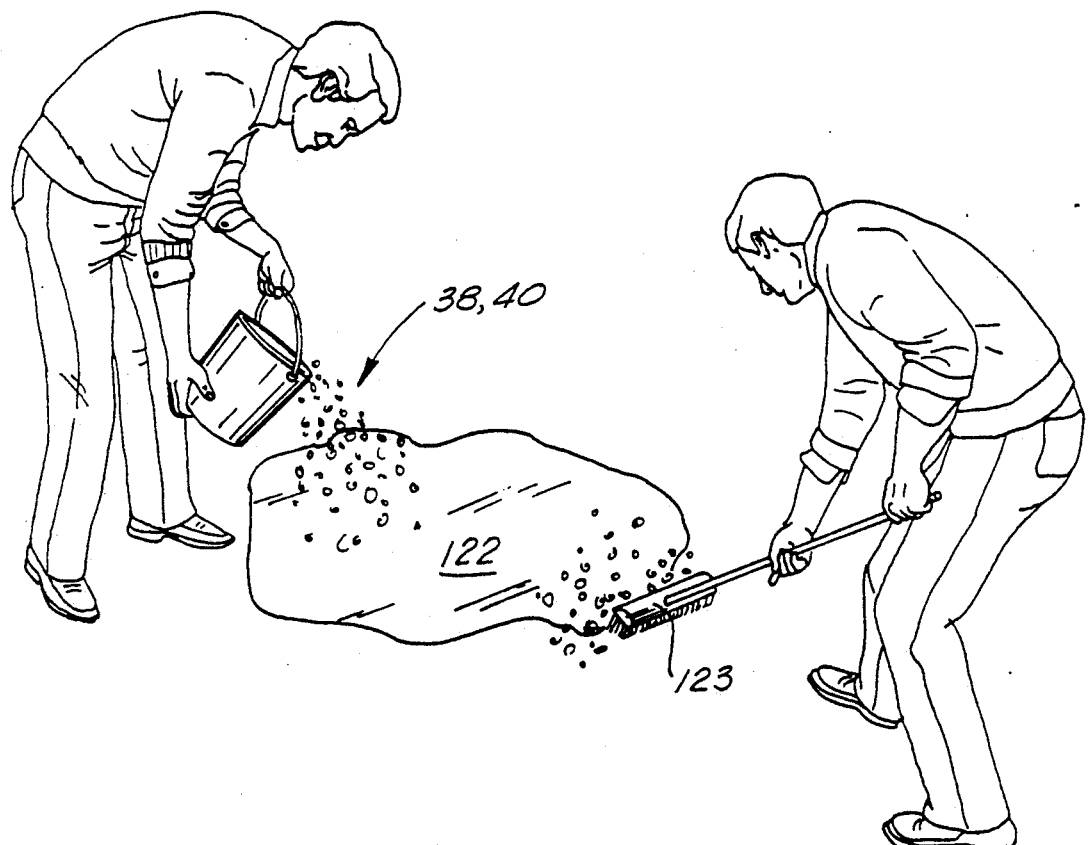
FIG. 8 is a perspective, schematic view illustrating the use of refined kenaf in the clean up of an oil spill and a dry environment.

Another use of refined kenaf fiber 38 and/or core 40 in the treatment of oil and in the absorption of oil can be seen in FIG. 6 in the form of an oil containment boom 112. 110 in FIG. 6 designates the sea water surface while 111 designates an oil slick 111 floating on the surface of the sea water 110. The oil slick has been contained by boom 112 which includes a floating portion 115 having an interior 113 containing kenaf fiber 38 and/or core 40. In the preferred embodiment, the floating portion 115 can provide an outer shell of porous material so that oil can be absorbed by the floating portion 115 and into the kenaf fiber and core 38, 40. In FIG. 6, the boom 112 can further be provided with a downwardly extending skirt 114 and a lowermost weighted portion 116 for holding the skirt 114 in a generally vertical position. It should be understood, that the oil slick 111 can also be contacted by dumping free kenaf fiber 38 and/or core particles 40 as is illustrated in FIG. 8 with respect to an oil slick 122 on dry land. Further, it should be understood that the oil slick 111 in FIG. 6 can be treated by adding oil-absorbing pads 117 as shown in FIG. 7. The oil-absorbing pad 117 includes a generally rectangular periphery 118 for example, and having a hollow interior 119 that can be filled with kenaf fiber 38 and/or core 40 in particulate form. The pad 117 further includes a pair of upper and lower pad elements 120, 121 which can be for example fabric material sewed together at periphery 118 to thus form a pillow that is filled with the kenaf fiber 38 and/or core 40. Thus, the upper and lower pad elements 120, 121 could be porous fabric material as an example.

In FIG. 8, oil absorption is illustrated for an oil slick 122 on dry land such as the floor of a shop or work area. In this case, kenaf fiber and/or core 38, 40 can be simply dumped onto the surface of the spill 122. Thereafter, the kenaf fiber and/or core 38, 40 in combination or alone soak up the oil 122 so that a common broom 123 can be used to collect the combined oil 122 and kenaf fiber/core 38, 40 for disposal. One of the advantages of the use of refined kenaf fiber 38 and/or core 40 is that it can be easily disposed of by burning after it has absorbed oil.

Thus, the present invention provides an improved method and apparatus for the absorption of oil, using kenaf preferably refined according to the above-discussed method. Thus, kenaf core 40 can be used as an oil absorbent in a situation where oil is floating on water (FIG. 6) and only where the oil is desired to be removed. This is because the kenaf core 40 has an affinity for oil but not for water. Further, the kenaf core 40 is buoyant and floats on water thus at the position wherein oil is floating. kenaf core 40 has been found to have an ability to distinguish between oil and water. When the core is spread over an oil slick 111 on the water surface 110, it will only absorb the oil slick 111. This unique characteristic is important when the cost of an oil spill cleanup is calculated. With the high cost of the disposal of the absorbent and the oil being a large expense of the cleanup, the weight of the material to be disposed of is reduced because kenaf core has absorbed only the oil and not the water. Further, it has been found that the core 40 can float for as much as two weeks on water.

Another important factor to take into consideration is the disposal method which can be used. The kenaf core 40 and kenaf core 38 are one hundred percent (100%) biodegradable which means that they can be placed into a landfill. Further, if the material (kenaf fiber/core 38-40 plus oil) is to be incinerated, kenaf produces about seven thousand (7,000) BTU's per pound and will have an ash residue of less than three percent (3%). The BTU rating will increase or decrease dependant upon what has been absorbed. One pound of kenaf fiber/core has been found to absorb about 1.2 gallons of oil.

The core size used on these oil spills is preferred to be an arrange of between 1/32 inches to about ¼ inches. The mixture of the core 40 and fiber 38 in the preferred embodiment is ninety percent (90%) core 40 and ten percent (10%) fiber 38.

When kenaf is used to pick up hydrocarbons off dry surfaces (see FIG. 8) it has the same disposal advantages as the above-mentioned use on water (FIG. 6). With the dry disposal material, the percentage of fiber 38 is preferably increased because it has been found to work more quickly than the core 40, having a quick wicking action.

Thus, the floor sweep mixture as shown in FIG. 8 will preferably have a mixture of approximately eighty percent (80%) kenaf core 40 and about twenty percent (20%) kenaf fiber 38. The average core size is preferably 3/16 inches in the embodiment of FIG. 8.

With regard to the pad of FIG. 7 and the boom of Figure 6, the kenaf core and fiber is preferably placed into a cotton or burlap pillow 117 and these are used to absorb a variety of hydrocarbons. Pads 117 can be used on dry ground spills (FIG. 8) or can be used on water spills (FIG. 6). The pads 117 are used on spills on water when the absorbent must be contained. The kenaf 38, 40 can also be placed inside three inch and six inch containment booms as shown in FIG. 6. The covering for the boom floating portion 115 is preferably made from a porous material such as one hundred percent (100%) cotton. The pads 117 and booms 112 are filled with a mixture of preferably eighty percent (80%) kenaf core 40 and twenty percent (20%) kenaf fiber 38. The size of the core 40 is preferably between 1/32 and ¼ inches. If the booms 112 are to be used to absorb oils on water 110, they will be filled with preferably ninety percent (90%) kenaf core 40 and ten percent (10%) kenaf fiber 38. The pads 117 and booms 112 are thus one hundred percent (100%) biodegradable and can be placed into landfills.

The following table lists the part numbers and part descriptions as used herein and as appearing in the attached drawings.

TABLE 1

| Part Number | PARTS LIST Description |
|---|---|
| 10 | processing apparatus |
| 11 | hopper frame |
| 12 | receptacle |
| 13 | kenaf wholestalks |
| 14 | wholestalk end portion |
| 15 | wholestalk end portion |
| 16 | cutting blade assembly |
| 16a | saw frame |
| 17 | blade |
| 17a | saw arm |
| 17b | pivot |
| 17c | extensible cylinder |
| 18 | teeth |
| 19 | conveyor |
| 20 | billet |
| 21 | conveyor |
| 22 | drum |
| 23 | transverse ribs |
| 25 | separator tray |
| 26 | crushed billets |
| 27 | conveyor |

TABLE 1-continued

| Part Number | PARTS LIST Description |
|---|---|
| 28 | core material |
| 29 | conveyor |
| 30 | drum crusher |
| 31 | drum crusher |
| 32 | transverse ribs |
| 33 | separator tray |
| 34 | crushed billets |
| 35 | core material |
| 36 | conveyor |
| 37 | conveyor |
| 38 | fiber material |
| 39 | conveyor |
| 40 | core material |
| 41 | conveyor |
| 42 | hopper |
| 43 | inlet |
| 44 | rotary separator |
| 45 | cylindrical screen |
| 46 | outlet |
| 47 | conveyor |
| 48 | conveyor |
| 49 | conveyor |
| 50 | baler |
| 51 | hammer mill |
| 52 | motor drive |
| 53 | conduit |
| 54 | silo |
| 55 | conduit |
| 56 | rotary separator |
| 57 | inlet |
| 58 | fine cylindrical screen |
| 59 | medium cylindrical screen |
| 60 | coarse cylindrical screen |
| 61 | conduit |
| 62 | storage bin |
| 63 | conduit |
| 64 | storage bin |
| 65 | conduit |
| 66 | storage bin |
| 67 | closed end portion |
| 68 | field drying step |
| 69 | cutting step |
| 70 | end feeding step |
| 71 | sizing step |
| 72 | threshing step |
| 73 | separation step |
| 74 | carting step |
| 75 | threshing step |
| 76 | separation step |
| 77 | final carting step |
| 80 | gauge |
| 81 | transverse portion |
| 82 | flat face |
| 83 | shaft |
| 84 | arrow |
| 100 | oil separation |
| 101 | cylindrical vessel |
| 102 | outer wall |
| 103 | hollow interior |
| 104 | end plate |
| 105 | end plate |
| 106 | flow inlet |
| 107 | flow outlet |
| 108 | arrow |
| 109 | arrow |
| 110 | water surface |
| 111 | oil slick |
| 112 | containment boom |
| 113 | particulate kenaf |
| 114 | boom skirt |
| 115 | boom floating portion |
| 116 | boom skirt weight |
| 117 | oil absorbing pad |
| 118 | pad periphery |
| 119 | hollow interior |
| 120 | upper pad element |
| 121 | lower pad element |
| 122 | oil spill |

TABLE 1-continued

PARTS LIST

| Part Number | Description |
|---|---|
| 123 | broom |

Because many varying and different embodiments may be made within the scope of the inventive concept herein taught, and because many modifications may be made in the embodiments and because many modifications may be made in the embodiments herein detailed in accordance with the descriptive requirement of the law, it is to be understood that the details herein are to be interpreted as illustrative and not in a limiting sense.

What is claimed as invention is:

1. A method of treating an oil spill comprising the steps of:
    a) cutting kenaf stalks into a plurality of short billets;
    b) crushing each billet sufficiently to break the core of each billet into pieces;
    c) separating the pieces of core from the billets; and
    d) using the pieces of core to absorb the oil.

2. The method of claim 1 wherein the billets are between five and nine inches in length.

3. The method of claim 1 wherein in step "c," the core and fiber are separated.

4. The method of claim 1 wherein the kenaf core is between 1/32 and 1 inch in diameter.

5. The method of claim 1 further comprising the step of placing the kenaf core into porous containers.

6. The method of claim 1 further comprising the step of separating the kenaf core pieces into a plurality of graded portions of different particle size.

7. The method of claim 1 wherein the particles are less than one inch in diameter.

8. The method of claim 7 wherein the particles are between 3/8" and 1" in diameter.

9. The method of claim wherein in step "c," the crushed kenaf is screened to separate kenaf core from kenaf fiber.

10. The method of claim 1 wherein in step "b," the length of kenaf fibers is substantially unchanged during crushing so that the cutting of stalks into billets defines the texture of the separated fiber.

* * * * *